United States Patent
Nakamura

(10) Patent No.: US 12,013,028 B2
(45) Date of Patent: Jun. 18, 2024

(54) TRANSMISSION SYSTEM FOR WORK MACHINE

(71) Applicant: KOMATSU LTD., Tokyo (JP)

(72) Inventor: Manabu Nakamura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/554,728

(22) PCT Filed: May 13, 2022

(86) PCT No.: PCT/JP2022/020171
§ 371 (c)(1),
(2) Date: Oct. 10, 2023

(87) PCT Pub. No.: WO2022/270170
PCT Pub. Date: Dec. 29, 2022

(65) Prior Publication Data
US 2024/0044402 A1 Feb. 8, 2024

(30) Foreign Application Priority Data

Jun. 25, 2021 (JP) ................................. 2021-106042

(51) Int. Cl.
*F16H 59/16* (2006.01)
*F16H 61/04* (2006.01)
*F16H 59/46* (2006.01)

(52) U.S. Cl.
CPC ......... *F16H 59/16* (2013.01); *F16H 61/0437* (2013.01); *F16H 59/46* (2013.01)

(58) Field of Classification Search
CPC .................................. F16H 59/16; F16H 59/46
See application file for complete search history.

(56) References Cited

U.S. PATENT DOCUMENTS

| 5,265,480 A | 11/1993 | Tsuji et al. |
| 6,175,793 B1 * | 1/2001 | Ironside .................. F16H 57/01 |
| | | 280/93.5 |

(Continued)

FOREIGN PATENT DOCUMENTS

| JP | 4-104024 A | 4/1992 |
| JP | 2011-75077 A | 4/2011 |

(Continued)

OTHER PUBLICATIONS

The International Search Report for the corresponding international application No. PCT/JP2022/020171, issued on Jul. 26, 2022.

*Primary Examiner* — Sherry L Estremsky
(74) *Attorney, Agent, or Firm* — Global IP Counselors, LLP

(57) ABSTRACT

A transmission system includes a transmission, first and second composite sensors, and a controller. The transmission has a clutch switchable between an engaged state and a disengaged state, a first shaft disposed on an input side of the clutch, and a second shaft disposed on an output side of the clutch. The first and second composite sensors detect rotation speeds and rotation phases of the first and second shafts, respectively. The controller acquires a load torque applied to the transmission. When the clutch is switched from the disengaged state to the engaged state, the controller derives a phase difference between the rotation phase of the first shaft detected by the first composite sensor and the rotation phase of the second shaft detected by the second composite sensor based on the time when the clutch has stopped slipping. The controller acquires the load torque based on the derived phase difference.

4 Claims, 3 Drawing Sheets

(56) References Cited

U.S. PATENT DOCUMENTS

| | | | | |
|---|---|---|---|---|
| 7,559,259 | B2* | 7/2009 | Fruhwirth | G01L 3/04 |
| | | | | 73/862.321 |
| 8,494,729 | B2* | 7/2013 | Li | B60K 6/38 |
| | | | | 180/197 |
| 9,739,672 | B2* | 8/2017 | Itomi | F16C 41/007 |
| 9,995,349 | B2* | 6/2018 | Fujiwara | F16C 41/001 |
| 2022/0081871 | A1 | 3/2022 | Oasa | |

FOREIGN PATENT DOCUMENTS

| | | |
|---|---|---|
| JP | 2015-31328 A | 2/2015 |
| JP | 2020-169508 A | 10/2020 |

* cited by examiner

TRANSMISSION SYSTEM FOR WORK MACHINE

CROSS-REFERENCE TO RELATED APPLICATIONS

This application is a U.S. National stage application of International Application No. PCT/JP2022/020171, filed on May 13, 2022. This U.S. National stage application claims priority under 35 U.S.C. § 119(a) to Japanese Patent Application No. 2021-106042, filed in Japan on Jun. 25, 2021, the entire contents of which are hereby incorporated herein by reference.

BACKGROUND

Field of the Invention

The present invention relates to a transmission system for a work machine.

Background Information

Conventionally, there is known a work machine (such as a wheel loader, a bulldozer, a motor grader, or a dump truck) that is provided with a transmission disposed between a drive source and an undercarriage. The transmission changes the rotation speed and the rotating direction of power from the power source and transfers the same to the undercarriage.

There is a need to overhaul the transmission before a component is damaged because damage to a component inside the transmission leads to failure. The timing at which a component becomes damaged can be estimated from the load torque applied to the transmission.

Japanese Patent Laid-open No. 2020-169508 discloses a means for calculating the load torque applied to the transmission on the basis of the rotation speed of the engine and a primary torque coefficient and a torque ratio of the transmission.

SUMMARY

However, there is a desire to accurately measure the load torque applied to the transmission in order to more precisely determine the need for an overhaul of the transmission.

An object of the present disclosure is to provide a transmission system for a work machine with which the load torque applied to the transmission can be measured accurately.

A transmission system for a work machine according to one aspect of the present disclosure comprises a transmission, a first composite sensor, a second composite sensor, and a controller. The transmission has a clutch that can be switched between an engaged state and a disengaged state, a first shaft disposed on an input side of the clutch, and a second shaft disposed on an output side of the clutch. The first composite sensor is configured to detect a rotation speed and a rotation phase of the first shaft. The second composite sensor is configured to detect a rotation speed and a rotation phase of the second shaft. The controller is configured to acquire a load torque applied to the transmission. When the clutch is switched from the disengaged state to the engaged state, the controller is configured to derive a phase difference between the rotation phase of the first shaft and the rotation phase of the second shaft based on the time when the clutch has stopped slipping. The controller is configured to acquire the load torque on the basis of the derived phase difference.

According to the technology of the present disclosure, there can be provided a transmission system for a work machine with which the load torque applied to a transmission can be measured accurately.

DETAILED DESCRIPTION OF EMBODIMENT(S)

Figure 1:
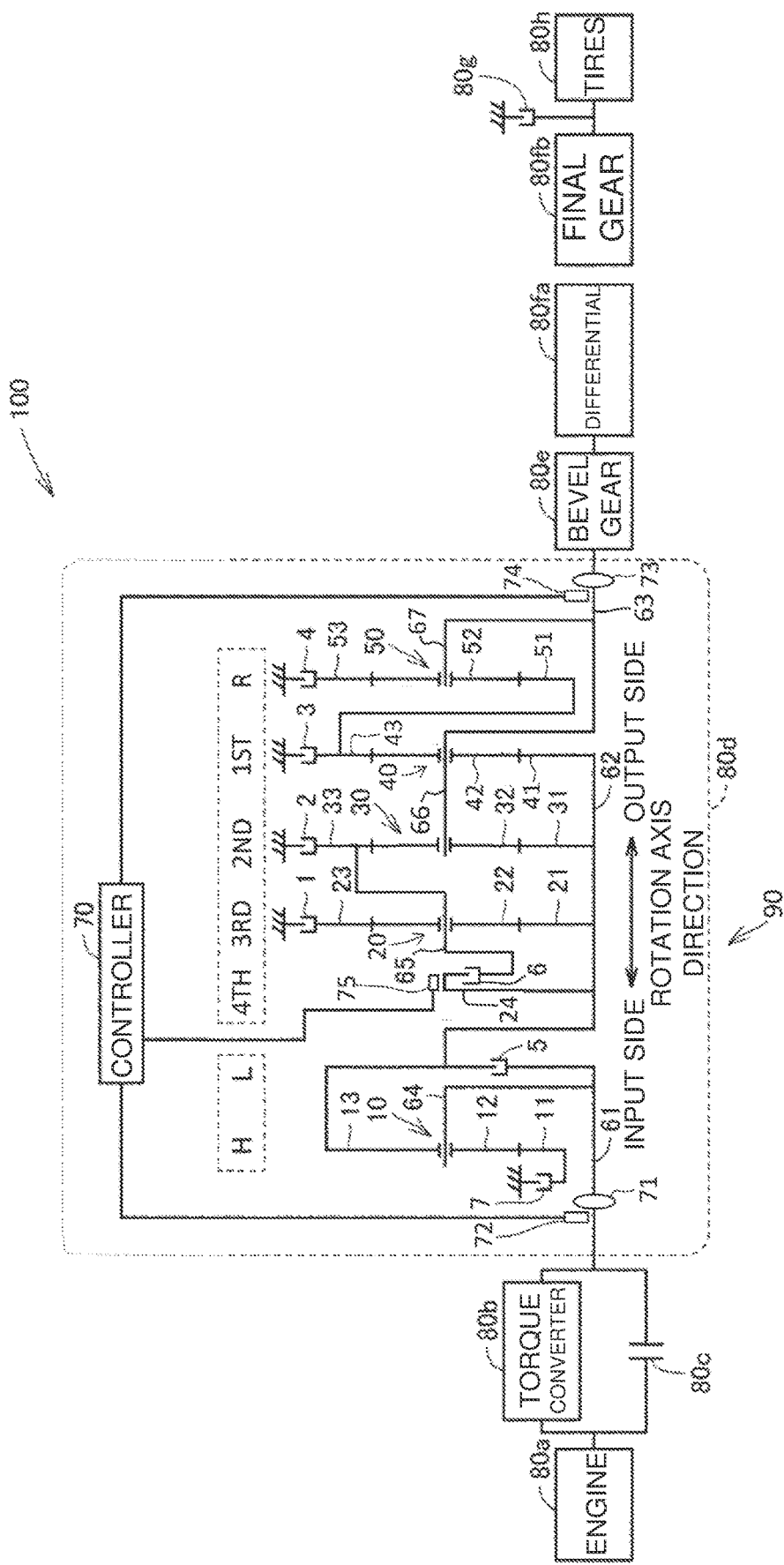
FIG. 1 is a schematic view of a configuration of a work machine according to an embodiment.

A transmission system according to an embodiment of the present invention shall be explained in detail with reference to the drawings. In the drawings, the same reference symbols are added to identical or corresponding constituent elements and a portion of the configurations are omitted or abbreviated for convenience in the explanation.

(Work Machine 100)

FIG. 1 is a schematic view of a configuration of a work machine 100 according to an embodiment. The work machine 100 is not limited in particular and may include a wheel loader, a bulldozer, a motor grader, a dump truck or the like.

The work machine 100 comprises an engine 80a, a torque converter 80b, a lock-up clutch 80c, a transmission 80d, a bevel gear 80e, a differential 80fa, a final gear 80fb, a brake 80g, and tires 80h. The engine 80a is an example of a driving power source. The tires 80h are examples of the undercarriage.

The engine 80a generates power. The power generated by the engine 80a is transmitted through the torque converter 80b or the lock-up clutch 80c to the transmission 80d. The transmission 80d changes the rotation speed and rotating direction of the power and transmits the power to the bevel gear 80e. The power transmitted to the bevel gear 80e rotationally drives the tires 80h through the differential 80fa and the final gear 80fb. The brake 80g is disposed between the final gear 80fb and the tires 80h.

The transmission 80d is, for example, a planetary gear-type transmission. The transmission 80d has first to fifth planetary gear mechanisms 10-50, a plurality of clutches 1-7, an input shaft 61, an intermediate shaft 62, an output shaft 63, and first to fourth carriers 64-67. The input shaft 61 is an example of a first shaft. The output shaft 63 is an example of a second shaft. The intermediate shaft 62 is an example of a third shaft.

The first to fifth planetary gear mechanisms 10-50 are disposed in order from the input side toward the output side.

The input shaft 61, the intermediate shaft 62, and the output shaft 63 are all disposed on the same axis. The input shaft 61, the intermediate shaft 62, and the output shaft 63 each extend along a predetermined rotational axis direction.

The power from the engine 80a is inputted to the input shaft 61. The power of which the rotation speed and the rotating direction are adjusted by the transmission 80d, is outputted from the output shaft 63.

The first planetary gear mechanism 10 has a first sun gear 11, a plurality of first planetary gears 12, a first ring gear 13, and a first carrier 64.

The input shaft 61 is inserted through the first sun gear 11. The first sun gear 11 and the input shaft 61 are able to rotate relatively. The first sun gear 11 is connected to the clutch 7 so that the rotation of the first sun gear 11 is braked. The clutch 7 is, for example, a brake.

The first planetary gears 12 each mesh with the first sun gear 11. The first planetary gears 12 revolve about the first sun gear 11. The first planetary gears 12 rotate on their own axes while being supported by the first carrier 64.

The first ring gear 13 meshes with the first planetary gears 12. The first ring gear 13 is fixed to the intermediate shaft 62 and revolves integrally with the intermediate shaft 62. The first ring gear 13 and the intermediate shaft 62 may be configured by one member.

The first carrier 64 is fixed to the input shaft 61 and rotates integrally with the input shaft 61. The first carrier 64 and the input shaft 61 may be configured by one member.

A clutch 5 is disposed between the input shaft 61 and the intermediate shaft 62. The clutch 5 can be switched between an engaged state (on state) and a disengaged state (off state). When the clutch 5 is in the engaged state, the clutch 5 enters a transmission state of transmitting the power from the engine 80a from the input shaft 61 to the intermediate shaft 62. When the clutch 5 is in the disengaged state, the clutch 5 enters a blocking state of blocking the transmission of power from the input shaft 61 to the intermediate shaft 62.

The second planetary gear mechanism 20 has a second sun gear 21, a plurality of second planetary gears 22, a second ring gear 23, and a second carrier 65.

The second sun gear 21 is fixed to the intermediate shaft 62 and revolves integrally with the intermediate shaft 62. The second sun gear 21 and the intermediate shaft 62 may be configured by one member.

The second planetary gears 22 mesh with the second sun gear 21. The second planetary gears 22 revolve about the second sun gear 21. The second planetary gears 22 rotate on their own axes while supported by the second carrier 65.

A clutch 6 is disposed between the second carrier 65 and the intermediate shaft 62 via a member 24. The member 24 is fixed to the intermediate shaft 62 and revolves integrally with the intermediate shaft 62. The clutch 6 can be switched between an engaged state (on state) and a disengaged state (off state). When the clutch 6 is in the engaged state with the member 24, the clutch 6 enters a transmission state of transmitting power from the intermediate shaft 62 to the second carrier 65. When the clutch 6 is in the disengaged state with the member 24, the clutch 6 enters a blocking state of blocking the transmission of the power from the intermediate shaft 62 to the second carrier 65.

The second ring gear 23 meshed with the second planetary gears 22. The second ring gear 23 is connected to a clutch 1 so that the rotation of the second ring gear 23 is braked. The clutch 1 is, for example, a brake.

The third planetary gear mechanism 30 has a third sun gear 31, a plurality of third planetary gears 32, a third ring gear 33, and a third carrier 66.

The third sun gear 31 is fixed to the intermediate shaft 62 and revolves integrally with the intermediate shaft 62. The third sun gear 31 and the intermediate shaft 62 may be configured by one member.

The third planetary gears 32 mesh with the third sun gear 31. The third planetary gears 32 revolve about the third sun gear 31. The third planetary gears 32 rotate on their own axes while supported by the third carrier 66.

The third ring gear 33 meshes with the third planetary gears 32. The third ring gear 33 is connected to a clutch 2 so that the rotation of the third ring gear 33 is braked. The clutch 2 is, for example, a brake. The third ring gear 33 is fixed to the second carrier 65 and rotates integrally with the second carrier 65. The third ring gear 33 and the second carrier 65 may be configured by one member.

The third carrier 66 is fixed to the output shaft 63 and rotates integrally with the output shaft 63. The third carrier 66 and the output shaft 63 may be configured by one member.

The fourth planetary gear mechanism 40 has a fourth sun gear 41, a plurality of fourth planetary gears 42, and a fourth ring gear 43.

The fourth sun gear 41 is fixed to the intermediate shaft 62 and revolves integrally with the intermediate shaft 62. The fourth sun gear 41 and the intermediate shaft 62 may be configured by one member.

The fourth planetary gears 42 mesh with the fourth sun gear 41. The fourth planetary gears 42 revolve about the fourth sun gear 41. The fourth planetary gears 42 rotate on their own axes while supported by the third carrier 66.

The fourth ring gear 43 meshes with the fourth planetary gears 42. The fourth ring gear 43 is connected to a clutch 3 so that the rotation of the fourth ring gear 43 is braked. The clutch 3 is, for example, a brake.

The fifth planetary gear mechanism 50 has a fifth sun gear 51, a plurality of fifth planetary gears 52, a fifth ring gear 53, and a fourth carrier 67.

The fifth sun gear 51 is fixed to the fourth ring gear 43 and rotates integrally with the fourth ring gear 43. The fifth sun gear 51 and the fourth ring gear 43 may be configured by one member.

The fifth planetary gears 52 mesh with the fifth sun gear 51. The fifth planetary gears 52 revolve about the fifth sun gear 51. The fifth planetary gears 52 rotate on their own axes while supported by the fourth carrier 67.

The fifth ring gear 53 meshes with the fifth planetary gears 52. The fifth ring gear 53 is connected to a clutch 4 so that the rotation of the fifth ring gear 53 is braked. The clutch 4 is, for example, a brake.

The fourth carrier 67 is fixed to the output shaft 63 and rotates integrally with the output shaft 63. The fourth carrier 67 and the output shaft 63 may be configured by one member.

The clutches 1-7 are, for example, hydraulic clutch mechanisms and are configured by a plurality of disks. The clutches 1-7 are each switched to an engaged state or a disengaged state in response to an instruction signal from a below mentioned controller 70.

In the transmission 80d configured as discussed above, high and low speeds (H, L), speed stages (1st, 2nd, 3rd, 4th), and forward and reverse travel (F, R) are each switched by combinations of the engagement and disengagement of the clutches 1-7. Accordingly, the ratio of the rotation speed of the intermediate shaft 62 with respect to the rotation speed of the input shaft 61 (referred to below as "first rotation speed ratio"), and the ratio of the rotation speed of the output shaft 63 with respect to the rotation speed of the intermediate shaft 62 (referred to below as "second rotation speed ratio"), are changed.

(Transmission System 90)

The work machine 100 comprises a transmission system 90 as illustrated in FIG. 1.

The transmission system 90 has the abovementioned transmission 80d, a first magnetic ring 71, a first magnetic sensor 72, a second magnetic ring 73, a second magnetic sensor 74, a rotation speed sensor 75, and the controller 70.

Figure 2:
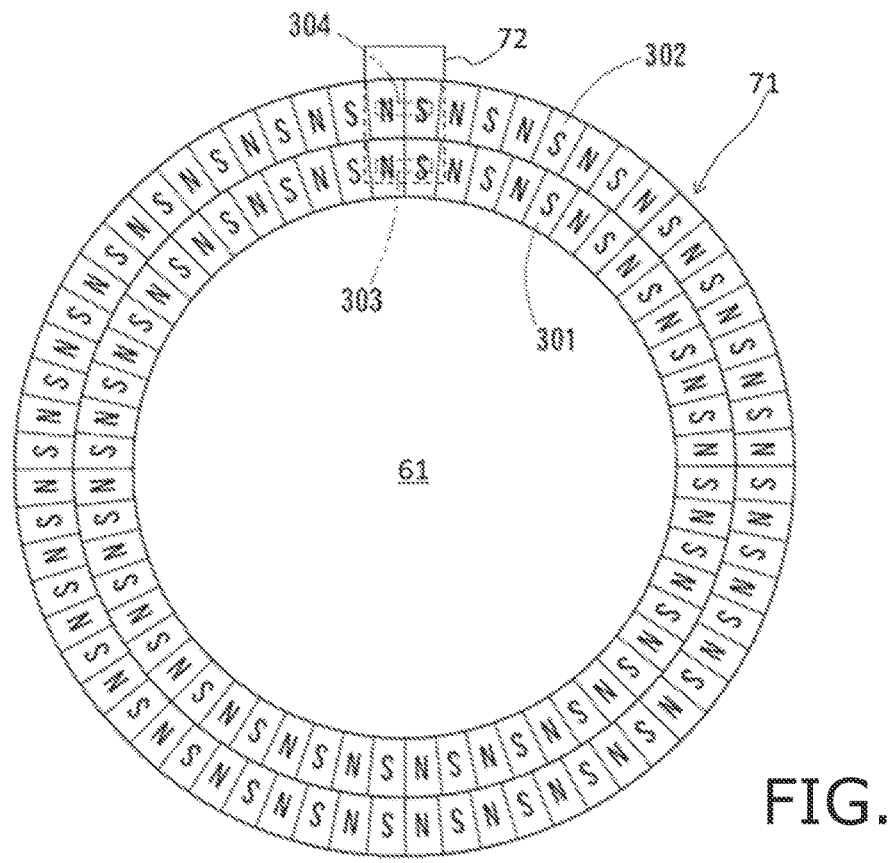
FIG. 2 is a cross-sectional view illustrating a configuration of a first magnetic ring and a first magnetic sensor according to the embodiment.

FIG. 2 is a cross-sectional view illustrating configurations of the first magnetic ring 71 and the first magnetic sensor 72. FIG. 2 illustrates a cross-section perpendicular to the rotating shaft direction of the input shaft 61.

The first magnetic ring 71 is fixed to the input shaft 61 of the transmission 80d and rotates integrally with the input shaft 61.

The first magnetic ring 71 has a main scale magnet 301 and vernier magnet 302. The main scale magnet 301 is formed in a toric shape. The main scale magnet 301 encircles the input shaft 61 in the circumferential direction. The main scale magnet 301 is made up of a plurality of magnet pairs (a pair of one N pole and one S pole) aligned in the circumferential direction. The vernier magnet 302 is formed in a toric shape. The vernier magnet 302 encircles the main scale magnet 301 in the circumferential direction. The vernier magnet 302 is made up of a plurality of magnet pole pairs that are aligned concentrically with the main scale magnet 301. When the number of magnet pole pairs of the main scale magnet 301 is N, the number of magnet pole pairs of the vernier magnet 302 is N−1 or N+1, whereby the vernier principle (specification of EP 2006-282172) is realized.

The first magnetic sensor 72 faces the first magnetic ring 71. The first magnetic sensor 72 detects the rotation speed per unit of time (abbreviated herein as "rotation speed") and the rotation phase (rotation angle) of the input shaft 61. The first magnetic sensor 72 is an example of a first composite sensor that detects both the rotation speed and the rotation phase of the input shaft 61 in a combined manner.

The first magnetic sensor 72 has a first magnetic sensor 303 and a second magnetic sensor 304. The first magnetic sensor 303 detects the magnetic flux density of the main scale magnet 301. The second magnetic sensor 304 detects the magnetic flux density of the vernier magnet 302.

When the main scale magnet 301 rotates integrally with the input shaft 61, the magnetic field of the main scale magnet 301 is detected by the first magnetic sensor 303 as a first magnetic signal in which the magnetic flux density changes to a sinusoid in response to the rotational displacement of the input shaft 61. Conversely, when the main scale magnet 301 rotates integrally with the input shaft 61, the magnetic field of the vernier magnet 302 is detected by the second magnetic sensor 304 as a second magnetic signal in which the magnetic flux density changes to a sinusoid having a shorter period than the first magnetic signal in response to the rotational displacement of the input shaft 61. The first magnetic sensor 303 converts the first magnetic signal to an electrical signal and outputs the electrical signal to the controller 70. The second magnetic sensor 304 converts the second magnetic signal to an electrical signal and outputs the electrical signal to the controller 70. The amount of deviation between the electrical signals changes due to the rotation position of the input shaft 61. Both the rotation speed and the rotation phase (rotation angle) of the input shaft 61 can be detected accurately on the basis of the vernier principle from said amounts of deviation.

The second magnetic ring 73 is fixed to the output shaft 63 of the transmission 80d and rotates integrally with the output shaft 63. The configuration of the second magnetic ring 73 is the same as the first magnetic ring 71 depicted in FIG. 2.

The second magnetic sensor 74 faces the second magnetic ring 73. The configuration of the second magnetic ring 74 is the same as the first magnetic ring 72 depicted in FIG. 2. The second magnetic sensor 74 detects the rotation speed and the rotation phase of the output shaft 63. The second magnetic sensor 74 is an example of a second composite sensor that detects both the rotation speed and the rotation phase of the output shaft 63 in a combined manner.

The rotation speed sensor 75 is disposed inside the transmission 80d. The rotation speed sensor 75 detects the rotation speed of the intermediate shaft 62. In the present embodiment, the rotation speed sensor 75 detects the rotation speed of the member 24. Among the methods for detecting the rotation speed by the rotation speed sensor 75, for example, a method that involves forming a gear on the outer edge of the member 24 and detecting the number of gears that pass by per unit of time with the rotation speed sensor 75 may be considered. A magnetic or optical sensor can be used as the rotation speed sensor 75 without being limited thereto.

The controller 70 performs switching of the transmission 80d by outputting instruction signals to each of the plurality of clutches 1-7. In the present embodiment, the controller 70 switches between high speed (H) and the low speed (L), switches the velocity stages (1st, 2nd, 3rd, 4th), and switches between forward travel and reverse travel (R).

The controller 70 acquires the rotation speed and the rotation phase of the input shaft 61 from the first magnetic sensor 72. The controller 70 acquires the rotation speed and the rotation phase of the output shaft 63 from the second magnetic sensor 74. The controller 70 acquires the rotation speed of the intermediate shaft 62 from the rotation speed sensor 75.

The controller 70 detects the timing at which slipping by any one of the clutches has stopped when switching the at least one clutch among the plurality of clutches 1-7 from the disengaged state to the engaged state. Slipping of the clutch has stopped signifies that the clutch is completely engaged. At this time, while the input shaft 61 and the output shaft 63 are coupled by means of the clutches, torque transmission from the input shaft 61 to the output shaft 63 does not occur. In the present embodiment, the timing that the slipping of the clutch has stopped is the same as the timing at which there is a match between the rotation speed of the input shaft 61, a multiplication value (referred to below as "first multiplication value") of the first rotation speed coefficient of the rotation speed of the input shaft 61, and a multiplication value (referred to below as "second multiplication value") of the rotation speed of the intermediate shaft 62 and the second rotation speed coefficient, match. Consequently, the controller 70 is able to detect that the slipping of the clutch has stopped when the rotation speed of the input shaft 61, the first multiplication value, and the second multiplication value all match.

The controller 70 initializes the rotation phases of the input shaft 61 and the output shaft 63 at the timing that the slipping of the clutch has stopped. Initializing the rotation phase signifies setting the rotation phase to zero. Therefore, the rotation phases of the input shaft 61 and the output shaft 63 are the same value when the slipping of the clutch has stopped.

Figure 3:
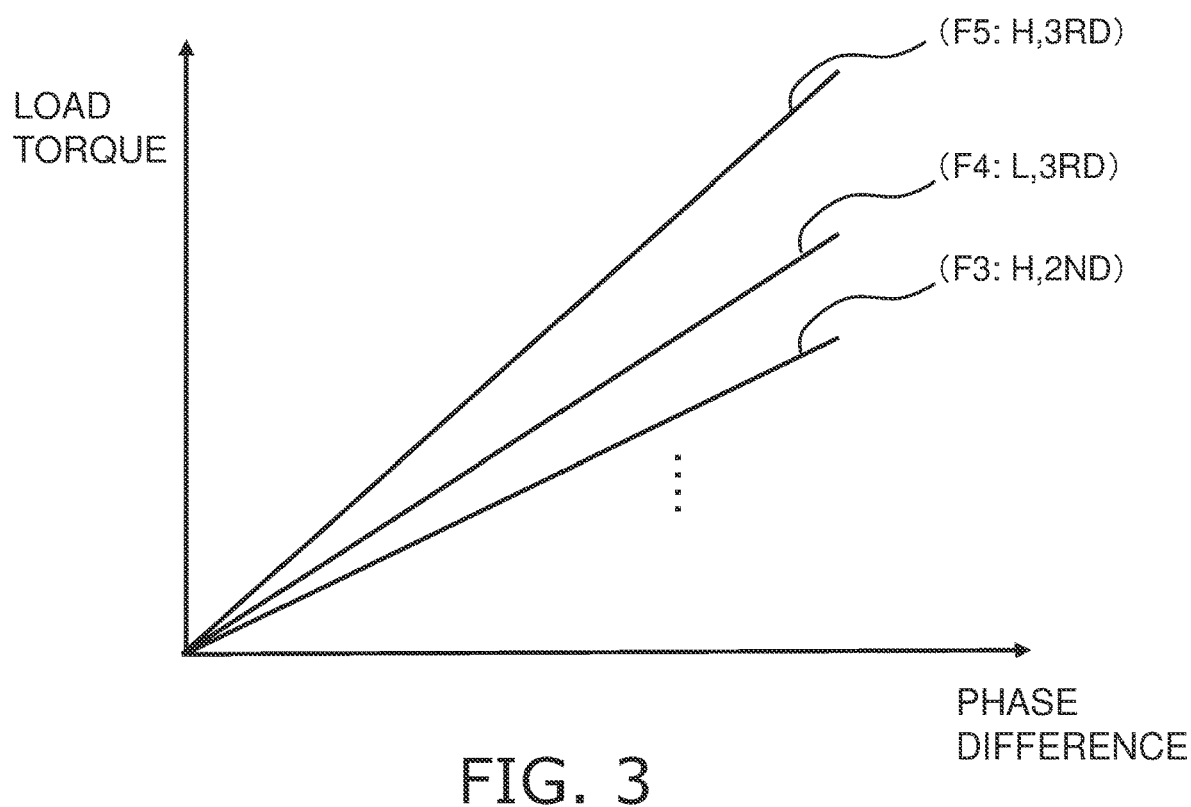
FIG. 3 is a map schematically illustrating the relationship between the phase difference and the load torque.

The controller 70 derives the phase difference between the rotation phase of the input shaft 61 and the rotation phase of the output shaft 63 after initializing the rotation phases. This phase difference is a result of the torque applied to the transmission 80d. The load torque applied to the transmission 80d is the torque that passes through the transmission 80d from the input shaft 61 toward the output shaft 63 coupled by means of the clutch. As the load torque increases, the rotation phase of the output shaft 63 increases relative to the rotation phase of the input shaft 61 and the phase difference increases. The controller 70 acquires the load torque applied to the transmission 80*d* on the basis of the determined phase difference. For example, as illustrated in FIG. 3, the controller 70 is able to use a map that represents the relationship between the phase difference and the load torque to derive the load torque from the phase difference. The controller 70 may also derive the load torque by substituting a phase difference derived with a formula that represents the relationship between the phase difference and the load torque. The controller 70 may also use a table that indicates the relationships between the phase difference and the load torque to derive the load torque. Furthermore, the controller 70 may derive the load torque after converting the phase difference to another parameter (for example, the torsion angle).

The relationship between the phase difference and the load torque can be understood beforehand by measuring the relationship between the load torque applied between the input shaft 61 and the output shaft 63 and the phase difference of the input shaft 61 and the output shaft 63 in bench testing. The relationship between the phase difference and the load torque differs according to the velocity stage and, as a result, it is preferred that the bench testing is performed for each combination of the plurality of clutches 1-7.

Moreover, the controller 70 may also derive the load torque in real time or may derive the load torque only at desired timings.

As described above, when the clutch is switched from the disengaged state to the engaged state, the controller 70 derives the phase difference between the rotation phase of the input shaft 61 and the rotation phase of the output shaft 63 based on the time when the clutch has stopped slipping. The controller 70 acquires the load torque applied to the transmission 80*d* on the basis of the derived phase difference.

In this way, according to the transmission system 90 of the present disclosure, the load torque can be acquired easily and with high accuracy by using the torsion in the transmission 80*d* produced by the torque transmission from the input shaft 61 to the output shaft 63.

In addition, because the abovementioned transmission system 90 can be constructed even if the first magnetic ring 71, the first magnetic sensor 72, the second magnetic ring 73, the second magnetic sensor 74, and the rotation speed sensor 75 are retrofitted to an existing transmission 80*d*, the present disclosure is especially beneficial when a torque sensor cannot be retrofitted to the inside of the transmission 80*d*.

(Method for Deriving Load Torque)

Figure 4:
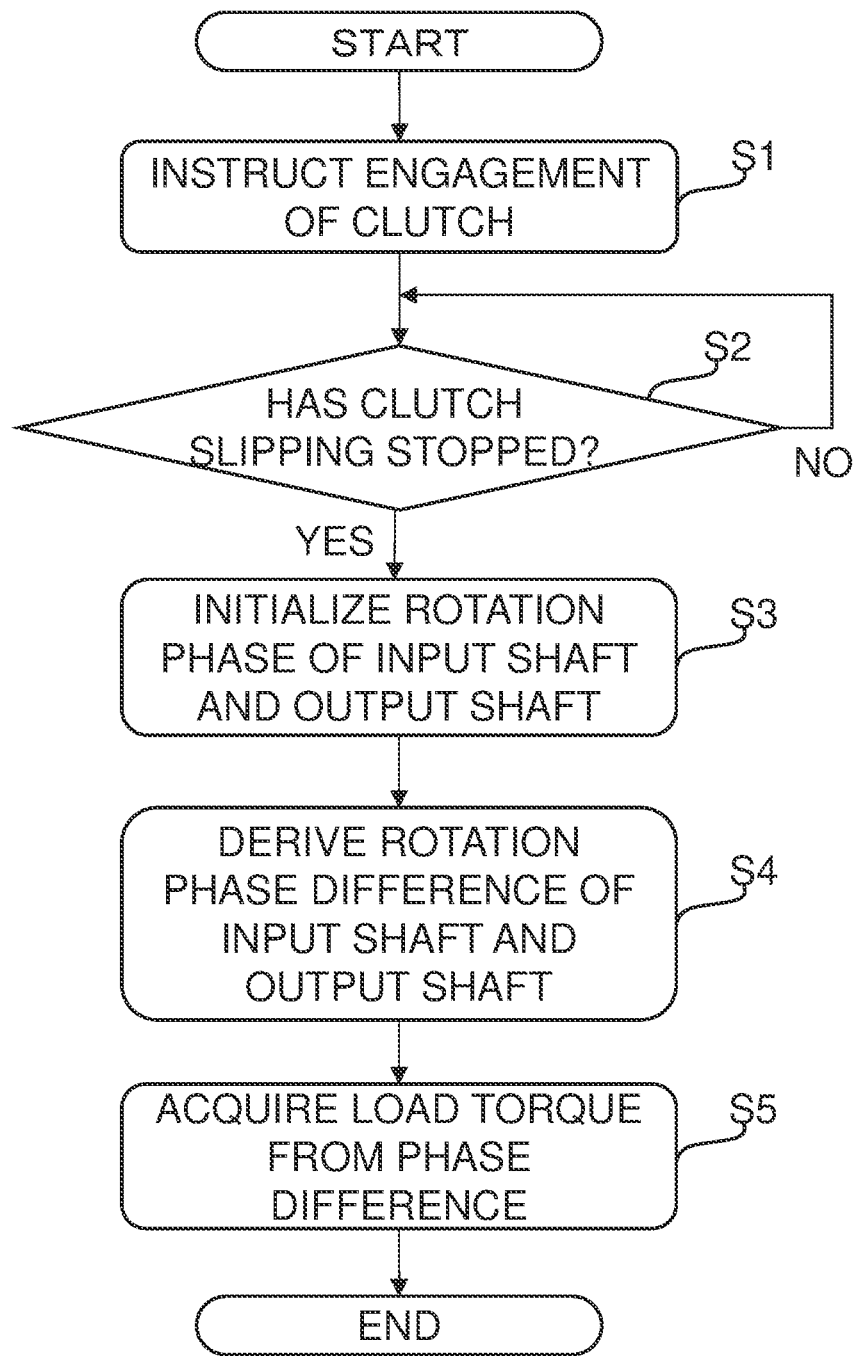
FIG. 4 is a flow chart for explaining a method for deriving the load torque.

FIG. 4 is a flow chart for explaining a method for determining the load torque.

In step S1, the controller 70 outputs an engagement instruction to at least one clutch among the plurality of clutches 1-7.

In step S2, the controller 70 evaluates whether or not the slipping of the clutch has stopped. The controller 70 determines that the slipping of the clutch has stopped if there is a match between the rotation speed of the input shaft 61, the first multiplication value (multiplication value of the rotation speed of the input shaft 61 and the first rotation ratio), and the second multiplication value (multiplication value of the rotation speed of the intermediate shaft 62 and the second rotation ratio), and determines that the slipping of the clutch has not stopped if there is no match. If the slipping of the clutch has not stopped, the process returns to step S2. If the slipping of the clutch has stopped, the process advances to step S3.

In step S3, the controller 70 initializes the rotation phases of the input shaft 61 and the output shaft 63.

In step S4, the controller 70 derives the phase difference between the rotation phase of the input shaft 61 and the rotation phase of the output shaft 63.

In step S5, the controller 70 acquires the load torque applied to the transmission 80*d* on the basis of the phase difference.

MODIFIED EXAMPLES OF THE EMBODIMENT

The present invention is not limited to the above embodiments and various changes and modifications may be made without departing from the spirit of the invention.

MODIFIED EXAMPLE 1

While an example of the transmission 80*d* that uses a planetary gear mechanism has been explained in the above embodiment, the transmission system according to the present disclosure is not limited to a transmission that uses a planetary gear mechanism and may also be applied to a transmission that has clutches.

MODIFIED EXAMPLE 2

While a case has been discussed in which the transmission system according to the present disclosure is applied to the transmission 80*d* comprising three shafts (the input shaft 61, the output shaft 63, and the intermediate shaft 62) and seven clutches 1-7 in the above embodiment, the present disclosure is not limited to such a configuration. For example, the transmission system according to the present disclosure can be applied to a transmission having one clutch, a first axis disposed on the input side of the clutch, and a second axis disposed on the output side of the clutch. In this case, the fact that the slipping of the clutch has stopped signifies that the rotation speed of the first axis matches the multiplication value of the rotation ratio of the second axis with respect to the first axis and the rotation speed of the first axis.

MODIFIED EXAMPLE 3

While the configurations of the first magnetic ring 71 and the first magnetic sensor 72 have been explained with reference to FIG. 2 in the above embodiment, the present disclosure is not limited thereto and the first magnetic ring 71 and the first magnetic sensor 72 may also detect the rotation phase of the input shaft 61.

MODIFIED EXAMPLE 4

While the transmission system 90 comprises the first magnetic sensor 72 that detects both the rotation speed and the rotation phase of the input shaft 61, and the second magnetic sensor 74 that detects both the rotation speed and the rotation phase of the output shaft 63 in the above embodiment, the present disclosure is not limited thereto.

The transmission system 90 may also be provided individually with a first rotation speed sensor that detects the rotation speed of the input shaft 61 and a first phase difference sensor that detects the rotation phase of the input shaft 61 in place of the first magnetic sensor 72.

Similarly, the transmission system 90 may also be provided individually with a second rotation speed sensor that detects the rotation speed of the output shaft 63 and a second phase difference sensor that detects the rotation phase of the output shaft 63 in place of the second magnetic sensor 74.

A sensor having the same configuration as the rotation speed sensor 75 according to the above embodiment may be used as the first and second rotation speed sensors. A sensor having the same configuration as the first magnetic sensor 72 according to the above embodiment may also be used as the first and second phase difference sensors.

MODIFIED EXAMPLE 5

While the input shaft 61, the intermediate shaft 62, and the output shaft 63 are disposed on the same axis in the above embodiment, at least one shaft among the input shaft 61, the intermediate shaft 62, and the output shaft 63 may be disposed on an axis different from the other axes.

The invention claimed is:

1. A transmission system for a work machine, the transmission system comprising:
   a transmission having
      a clutch that can be switched between an engaged state and a disengaged state,
      a first shaft disposed on an input side of the clutch, and
      a second shaft disposed on an output side of the clutch;
   a first composite sensor configured to detect a rotation speed and a rotation phase of the first shaft;
   a second composite sensor configured to detect a rotation speed and a rotation phase of the second shaft; and
   a controller configured to acquire a load torque applied to the transmission,
   when the clutch is switched from the disengaged state to the engaged state, the controller being configured to derive a phase difference between the rotation phase of the first shaft detected by the first composite sensor and the rotation phase of the second shaft detected by the second composite sensor based on the time when the clutch has stopped slipping, and
   the controller being configured to acquire the load torque based on the derived phase difference.

2. The transmission system according to claim 1, further comprising:
   a third shaft disposed
      between the first shaft and the clutch or
      between the clutch and the second shaft; and
   a rotation sensor configured to detect a rotation speed of the third shaft,
   when the clutch is switched from the disengaged state to the engaged state, the controller being configured to derive the phase difference based on the time when the clutch has stopped slipping.

3. A transmission system for a work machine, the transmission system comprising:
   a transmission having
      a clutch that can be switched between an engaged state and a disengaged state,
      a first shaft disposed on the input side of the clutch, and
      a second shaft disposed on an output side of the clutch;
   a first rotation sensor configured to detect a rotation speed of the first shaft;
   a first phase difference sensor configured to detect a rotation phase of the first shaft;
   a second rotation sensor configured to detect a rotation speed of the second shaft;
   a second phase difference sensor configured to detect a rotation phase of the second shaft; and
   a controller configured to acquire a load torque applied to the transmission,
   when the clutch is switched from the disengaged state to the engaged state, the controller being configured to derive a phase difference between the rotation phase of the first shaft detected by the first phase difference sensor and the rotation phase of the second shaft detected by the second phase difference sensor based on the time when the clutch has stopped slipping, and
   the controller being configured to acquire the load torque based on the derived phase difference.

4. The transmission system according to claim 3, further comprising:
   a third shaft disposed between the first shaft and the clutch or between the clutch and the second shaft; and
   a third rotation sensor configured to detect a rotation speed of the third shaft,
   when the clutch is switched from the disengaged state to the engaged state, the controller being configured to derive the phase difference based on the time when the clutch has stopped slipping.

* * * * *